US010663575B2

(12) United States Patent
Watanabe et al.

(10) Patent No.: US 10,663,575 B2
(45) Date of Patent: May 26, 2020

(54) OFF-ROAD DUMP TRUCK AND OBSTACLE DISCRIMINATION DEVICE

(71) Applicant: HITACHI CONSTRUCTION MACHINERY CO., LTD., Tokyo (JP)

(72) Inventors: Atsushi Watanabe, Tokyo (JP); Takuya Naka, Tokyo (JP); Shinichi Uotsu, Tsuchiura (JP); Koei Takeda, Tsuchiura (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 108 days.

(21) Appl. No.: 15/774,345

(22) PCT Filed: Sep. 8, 2016

(86) PCT No.: PCT/JP2016/076411
§ 371 (c)(1),
(2) Date: May 8, 2018

(87) PCT Pub. No.: WO2017/110159
PCT Pub. Date: Jun. 29, 2017

(65) Prior Publication Data
US 2019/0250263 A1    Aug. 15, 2019

(30) Foreign Application Priority Data

Dec. 25, 2015   (JP) .................................. 2015-254139

(51) Int. Cl.
*G01S 13/52*     (2006.01)
*B60P 1/04*      (2006.01)
(Continued)

(52) U.S. Cl.
CPC .............. *G01S 13/52* (2013.01); *B60P 1/04* (2013.01); *G01S 7/2927* (2013.01); *G01S 7/412* (2013.01);
(Continued)

(58) Field of Classification Search
CPC .............................. G01S 13/52; G01S 13/931
See application file for complete search history.

(56) References Cited

U.S. PATENT DOCUMENTS

| 8,766,816 B2 * | 7/2014 | Takatsudo | ................. B60R 1/00 340/3.41 |
| 8,781,644 B2 * | 7/2014 | Samukawa | ........... B60W 50/14 701/1 |

(Continued)

FOREIGN PATENT DOCUMENTS

| JP | 2004-184332 A | 7/2004 |
| JP | 2009-31053 A  | 2/2009 |

(Continued)

OTHER PUBLICATIONS

International Search Report of PCT/JP2016/076411 dated Nov. 22, 2016.

*Primary Examiner* — Peter M Bythrow
(74) *Attorney, Agent, or Firm* — Mattingly & Malur, PC

(57) ABSTRACT

An off-road dump truck includes a vehicle body, a peripheral recognition device, and an obstacle discrimination device. The peripheral recognition device detects obstacle candidates in front of the vehicle body. The obstacle discrimination device classifies the obstacle candidates, which were detected by the peripheral recognition device, into obstacles and non-obstacles and outputs, as obstacles, the obstacle candidates classified as obstacles. The obstacle discrimination device includes a travel state determination section, a distance filter section, and a reflection intensity filter section. The travel state determination section determines whether each obstacle candidate is a moving object or a stationary object. The distance filter section compares a distance, where the stationary object was first detected, with a distance threshold. The reflection intensity filter section calculates statistical information based on reflection intensity (Continued)

information on the obstacle candidate, and based on a comparison result of the statistical information with a threshold, classifies the obstacle candidate.

6 Claims, 13 Drawing Sheets

(51) Int. Cl.

| | | |
|---|---|---|
| *G08G 1/16* | (2006.01) | |
| *G01S 13/931* | (2020.01) | |
| *G01S 7/41* | (2006.01) | |
| *G01S 7/292* | (2006.01) | |
| *G01S 13/86* | (2006.01) | |
| *G01S 17/931* | (2020.01) | |
| *B60W 30/08* | (2012.01) | |
| *G05D 1/02* | (2020.01) | |

(52) U.S. Cl.
CPC ............ *G01S 7/415* (2013.01); *G01S 13/865* (2013.01); *G01S 13/931* (2013.01); *G01S 17/931* (2020.01); *G08G 1/16* (2013.01); *B60W 30/08* (2013.01); *B60W 2520/10* (2013.01); *B60W 2554/00* (2020.02); *B60Y 2200/25* (2013.01); *G01S 2013/932* (2020.01); *G01S 2013/9323* (2020.01); *G01S 2013/93271* (2020.01); *G05D 1/0214* (2013.01); *G05D 1/0257* (2013.01); *G05D 2201/0202* (2013.01)

(56) References Cited

U.S. PATENT DOCUMENTS

| | | | |
|---|---|---|---|
| 9,384,388 B2 * | 7/2016 | Ichida | ............... G08G 1/165 |
| 9,721,460 B2 * | 8/2017 | Takemura | .......... G06K 9/00798 |
| 2007/0291130 A1 * | 12/2007 | Broggi | ................. G01S 17/023 |
| | | | 348/218.1 |
| 2009/0027180 A1 * | 1/2009 | Shibata | .................... G01S 7/41 |
| | | | 340/435 |
| 2013/0093614 A1 * | 4/2013 | Tokoro | .................... G01S 13/34 |
| | | | 342/109 |
| 2013/0321195 A1 * | 12/2013 | Moriuchi | ................ G01S 13/52 |
| | | | 342/70 |
| 2015/0032324 A1 * | 1/2015 | Ichinose | ............. B60W 30/143 |
| | | | 701/23 |

FOREIGN PATENT DOCUMENTS

| | | |
|---|---|---|
| JP | 2012-47609 A | 3/2012 |
| JP | 2013-186761 A | 9/2013 |
| WO | 2011/158292 A | 12/2011 |

* cited by examiner

FIG. 3

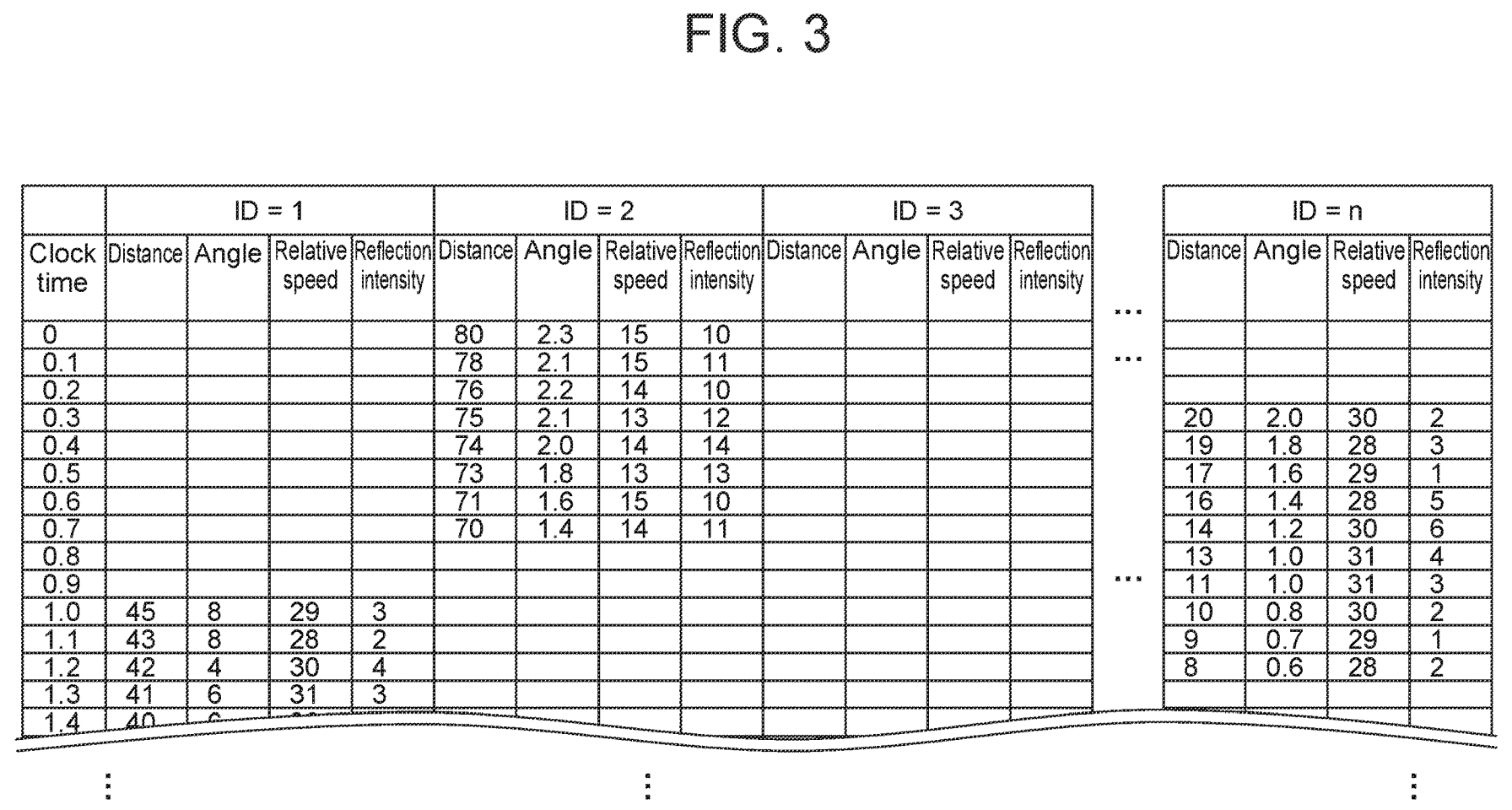

| Clock time | ID = 1 | | | | ID = 2 | | | | ID = 3 | | | | ID = n | | | |
|---|---|---|---|---|---|---|---|---|---|---|---|---|---|---|---|---|
| | Distance | Angle | Relative speed | Reflection intensity | Distance | Angle | Relative speed | Reflection intensity | Distance | Angle | Relative speed | Reflection intensity | Distance | Angle | Relative speed | Reflection intensity |
| 0 | | | | | 80 | 2.3 | 15 | 10 | | | | | | | | |
| 0.1 | | | | | 78 | 2.1 | 15 | 11 | | | | | | | | |
| 0.2 | | | | | 76 | 2.2 | 14 | 10 | | | | | 20 | 2.0 | 30 | 2 |
| 0.3 | | | | | 75 | 2.1 | 13 | 12 | | | | | 19 | 1.8 | 28 | 3 |
| 0.4 | | | | | 74 | 2.0 | 14 | 14 | | | | | 17 | 1.6 | 29 | 1 |
| 0.5 | | | | | 73 | 1.8 | 13 | 13 | | | | | 16 | 1.4 | 28 | 5 |
| 0.6 | | | | | 71 | 1.6 | 15 | 10 | | | | | 14 | 1.2 | 30 | 6 |
| 0.7 | | | | | 70 | 1.4 | 14 | 11 | | | | | 13 | 1.0 | 31 | 4 |
| 0.8 | | | | | | | | | | | | | 11 | 1.0 | 31 | 3 |
| 0.9 | | | | | | | | | | | | | 10 | 0.8 | 30 | 2 |
| 1.0 | 45 | 8 | 29 | 3 | | | | | | | | | 9 | 0.7 | 29 | 1 |
| 1.1 | 43 | 8 | 28 | 2 | | | | | | | | | 8 | 0.6 | 28 | 2 |
| 1.2 | 42 | 4 | 30 | 4 | | | | | | | | | | | | |
| 1.3 | 41 | 6 | 31 | 3 | | | | | | | | | | | | |
| 1.4 | 40 | | | | | | | | | | | | | | | |

...

OFF-ROAD DUMP TRUCK AND OBSTACLE DISCRIMINATION DEVICE

TECHNICAL FIELD

This invention relates to an off-road dump truck and an obstacle discrimination device.

BACKGROUND ART

As a conventional technique relating to the avoidance of a collision with a preceding vehicle or an obstacle, Patent Document 1 discloses an object recognition device for a vehicle, that, in order to determine whether an object detected by an obstacle detection device is a vehicle or not, "if plural reflected waves are received from reflecting objects, first determines whether the reflecting objects from which the plural reflected waves have occurred are a single reflecting object, and, if determined to be the single reflecting object through the determination, compares the highest one of intensities of the reflected waves from the single reflecting object with a reference intensity to determine whether the single reflecting object is a vehicle or a non-vehicle. (extracted from the Abstract)".

PRIOR ART DOCUMENT

Patent Document

Patent Document 1: JP 2004-184332 A

DISCLOSURE OF THE INVENTION

Problem to Be Solved by the Invention

The surface of an unpaved off-road in a mine or the like is bumpy compared with the surface of a paved road so that, when a mining dump truck travels on the bumpy road surface, the truck body violently jolts in up-and-down and left-and-right directions, and following these jolts, an obstacle detection device, such as a millimeter wave radar, mounted on the vehicle body also considerably shakes in up-and-down and left-and-right directions. Hence, a millimeter wave or laser light is radiated against a preceding vehicle from an oblique direction or lateral direction instead of squarely opposing the preceding vehicle, and the reflection intensity may become lower than that which would be obtained if detected squarely opposing the preceding vehicle. On the other hand, a reflection intensity from a bump on or pothole in the surface of a travel road may be detected higher than that detected from a leveled road surface.

In general, reflection intensity from a vehicle is overwhelmingly higher than that from a road surface, so that the setting of a threshold for reflection intensities can distinguish the vehicle and the road surface. On the surface of an unpaved off-road, however, reflection intensity from the off-road surface may be of an equal level to that from a vehicle for the above-described reason, and therefore the distinction between the vehicle and the off-road surface cannot be made depending simply upon the magnitudes of reflection intensities from them. If the technique disclosed in Patent Document 1 is applied to a vehicle traveling on the surface of an unpaved off-road, a problem therefore arises that the accuracy of determination as to whether an obstacle is the vehicle or a non-vehicle is lowered.

The present invention, therefore, has as an object thereof the provision of a technique that suppresses misrecognition of a non-vehicle as a vehicle on the surface of an unpaved off-road, the surface having bumps and potholes.

Means for Solving the Problem

To achieve the above-described object, the present invention is characterized in that an off-road dump truck includes a peripheral recognition device configured to radiate an electromagnetic wave forward in a moving direction, to receive reflected waves from obstacle candidates, and to detect intensities of the reflected waves, distances from an own vehicle to the obstacle candidates and relative speeds of the obstacle candidates to the own vehicle, a speed sensor configured to detect a travel speed of the own vehicle, and an obstacle discrimination device configured to classify obstacles and non-obstacles in the obstacle candidates, and to output, as obstacles, the obstacle candidates classified as the obstacles, wherein the obstacle discrimination device includes a travel state determination section that based on the relative speed of each obstacle candidate and the travel speed of the own vehicle, determines whether the obstacle candidate is a stationary object or a moving object, and, if the obstacle candidate has been determined as the moving object, outputs the obstacle candidate as an obstacle, a distance filter section that, if the obstacle candidate has been determined as the stationary object, determines the obstacle candidate to be an object other than that which is to be outputted if a distance where the obstacle candidate was first detected is smaller than a distance threshold set to distinguish vehicles and non-vehicles, and a reflection intensity filter section that, if the distance where the obstacle candidate determined as the stationary object was first detected is equal to or greater than the distance threshold, calculates statistical information based on reflection intensity information indicating the intensities of the reflected waves from the obstacle candidate, and determines the obstacle candidate to be an object other than that which is to be outputted if the reflection intensity information is less than a reflection intensity threshold set to distinguish vehicles and non-vehicles but outputs the obstacle candidate as an obstacle if the reflection intensity information is equal to or greater than the reflection intensity threshold.

Advantageous Effects of the Invention

According to the present invention, it is possible to provide a technique that suppresses misrecognition of a non-vehicle as a vehicle on a surface of an unpaved off-road, the surface having bumps and potholes. Problems, configurations and advantageous effects other than those described above will become apparent from the following description of an embodiment.

BRIEF DESCRIPTION OF THE DRAWINGS

FIG. 3 is a diagram showing one example of detection data by millimeter wave radar.

MODES FOR CARRYING OUT THE INVENTION

Figure 1:
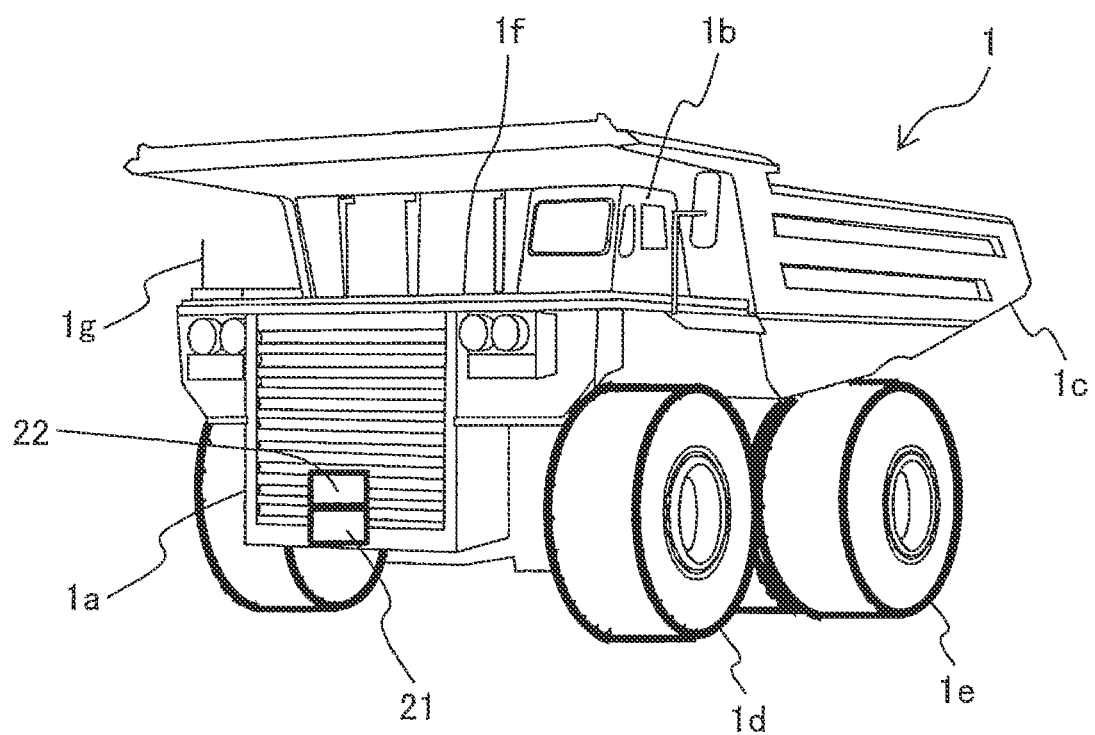
FIG. 1 is a perspective view showing an outline of a dump truck.
Figure 2:
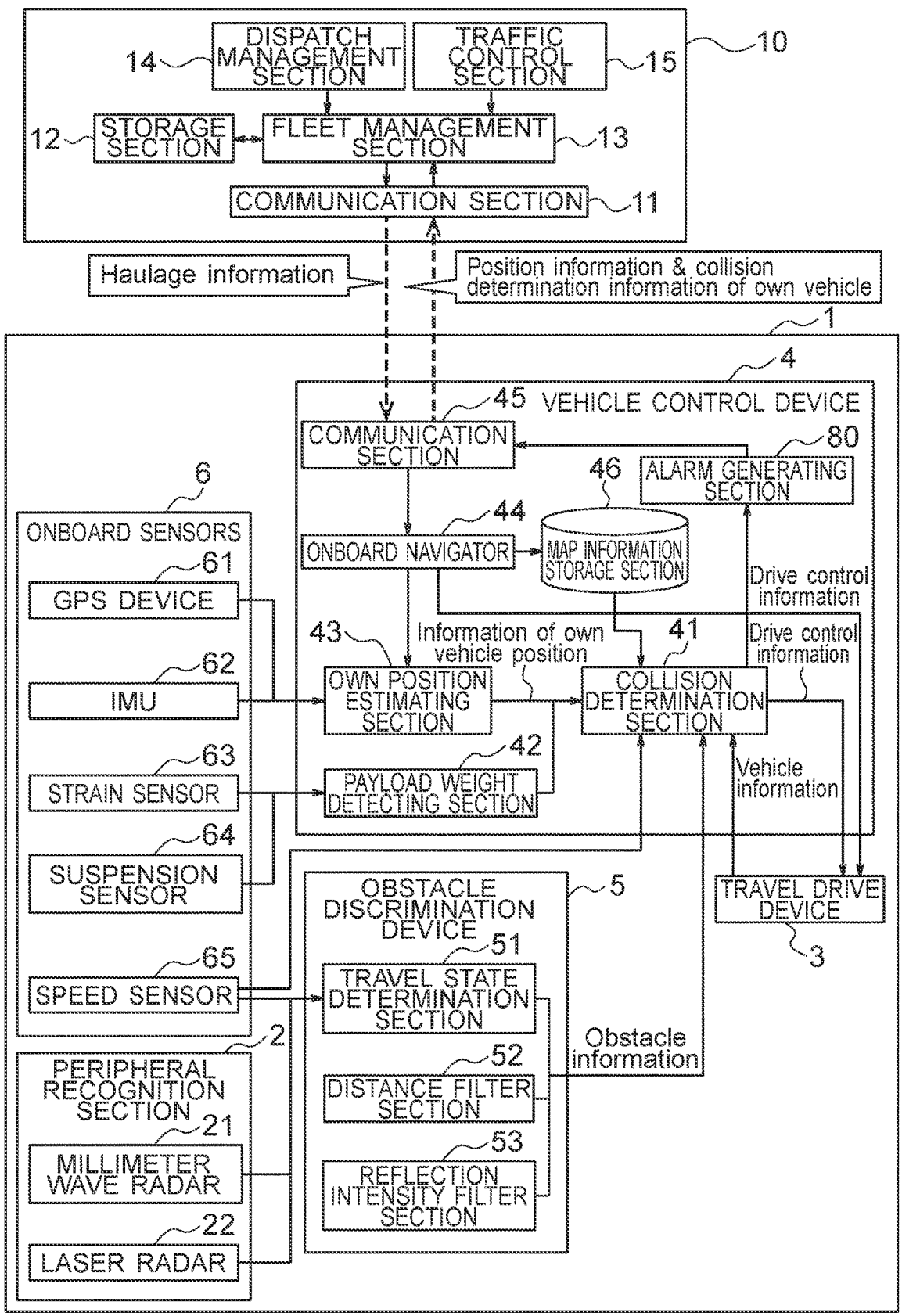
FIG. 2 is a block diagram illustrating functional configurations of a control server and the dump truck, which make up an autonomous travel dump truck system.

An embodiment of the present invention will hereinafter be described with reference to the drawings. In the following embodiment, a description will be made by taking an autonomous travel dump truck (hereinafter simply called "dump truck"), which autonomously travels in a mine, as one example of an off-road dump truck. Referring first to FIGS. 1 and 2, a description will be made about the configuration of the autonomous travel dump truck system according to the embodiment. FIG. 1 is a perspective view showing an outline of the dump truck. FIG. 2 is a block diagram illustrating functional configurations of a control server and the dump truck, which make up the autonomous travel dump truck system.

As shown in FIG. 1, the dump truck 1 is provided with a vehicle body 1a, a cab 1b disposed above a front section of the vehicle body 1a, a vessel 1c mounted pivotally up and down on the vehicle body 1a, hoist cylinders (not shown) that raise or lower the vessel 1c, and left and right, front wheels 1d and rear wheels 1e on which the vehicle body 1a is supported for traveling.

The dump truck 1 is also provided with a millimeter wave radar 21 and a laser radar 22 on a front wall of the vehicle body 1a. The millimeter wave radar 21 and laser radar 22 each radiate an electromagnetic wave and receive a reflected wave to detect a preceding vehicle such another dump truck 1 or the like. They hence correspond to a peripheral recognition device 2 (see FIG. 2). In FIG. 2, a sensor fusion architecture with the millimeter wave radar 21 and laser radar 22 mounted therein is illustrated as the peripheral recognition device 2, but the peripheral recognition device 2 may be configured of the millimeter wave radar 21 alone or the laser radar 22 alone.

Subsequent to reflection of a radiated electromagnetic wave by a vehicle, obstacle or the like in a periphery, the millimeter wave radar 21 and laser radar 22 each receive a reflected wave, and generate and output information on a position (distance and angle from an own vehicle) of, a relative speed of and a reflection intensity from the vehicle, obstacle or the like in the periphery. The description will hereinafter be continued with a focus being placed on a case that detection has been made by the millimeter wave radar 21. However, similar results are also obtained when detection has been made by the laser radar 22 or when detection has been made by the millimeter wave radar 21 and laser radar 22.

As illustrated in FIG. 2, on the dump truck 1, the peripheral recognition device 2, travel drive devices 3, a vehicle control device 4, an obstacle discrimination device 5, and onboard sensors 6 are mounted. The vehicle control device 4 includes a collision determination section 41, a payload weight detecting section 42, an own position estimating section 43, on onboard navigator 44, a communication section 45, a map information storage section 46, and an alarm generating section 80. In this embodiment, an example in which the vehicle control device 4 and the obstacle discrimination device 5 are configured as discrete modules is illustrated, but these devices may be configured as an integral unit. On the other hand, the control server 10 is configured including a communication section 11, a storage section 12, a fleet management section 13, a dispatch management section 14, and a traffic control section 15. The communication section 11 of the control server 10 transmits haulage information to the communication section 45 of the dump truck 1, and also receives position information and collision determination information on the own vehicle from the communication section 45 of the dump truck 1.

The onboard sensors 6 include a GPS device 61 as a position detecting device that detects the position of the dump truck 1, i.e., the own vehicle, an inertial measurement unit (IMU) 62 for detecting an acceleration and inclination of the vehicle body 1a, a strain sensor 63, a suspension sensor 64 that detects a stroke of a suspension connecting a wheel and the vehicle body 1a each other, and a speed sensor 65 that detects a travel speed of the dump truck 1. The speed sensor 65 may be configured with a wheel rotational-speed sensor, which detects a rotational speed of one of the front wheels 1d that function as driven wheels, and detects the speed of the dump truck 1 from the rotational speed.

When the millimeter wave radar 21 has received a reflected wave, there is either a situation where the dump truck 1 needs to take a collision avoidance action (for example, when a preceding vehicle has been detected) or a situation where a reflected wave from a bump on or pothole in a road surface has been received and no collision avoidance action is needed. Therefore, in this embodiment, an output result from the millimeter wave radar 21 is called "an obstacle candidate", which is then called "an obstacle" if a collision avoidance action is needed or "a non-obstacle" if no collision avoidance action is needed. The obstacle discrimination device 5 performs processing that discriminates an obstacle candidate to be an obstacle or a non-obstacle.

The obstacle discrimination device 5, therefore, includes a travel state determination section 51, a distance filter section 52, and a reflection intensity filter section 53.

Into the travel state determination section 51, travel speed information on the own vehicle is inputted from the speed sensor 65. Further, the detection result of the obstacle candidate as received at the millimeter wave radar 21 is also inputted. The travel state determination section 51 then calculates a travel speed of the obstacle candidate based on the travel speed of the own vehicle and the relative speed of the obstacle candidate, and sets a threshold for travel speeds to discriminate stationary objects and traveling vehicles. The travel state determination section 51 outputs the traveling vehicle as an obstacle, or outputs information on the obstacle candidate, which has been discriminated as a stationary object, to the distance filter section 52.

To remove non-obstacles having no risk of collision, such as road surfaces, from obstacle candidates determined as stationary objects at the travel state determination section 51, the distance filter section 52 discriminates each stationary object, which was first detected at a predetermined distance or shorter, to be a non-obstacle. The term "predetermined distance" as used herein means a distance threshold set to distinguish vehicles and non-vehicles (for example, road surfaces and shoulders). As a vehicle has higher reflection intensity than a non-vehicle, the vehicle begins to be detected from a further distance. Based on this characteristic, a distance threshold to distinguish vehicles and non-vehicles can be set at a distance where the non-vehicle begins to be first detected.

Finally, the reflection intensity filter section 53 calculates statistical information of reflection intensities from the obstacle, distinguishes a vehicle and a non-vehicle based on the calculated statistical information of the reflection intensities, and removes the obstacle, which is the non-vehicle, as a non-obstacle.

The obstacle discrimination device 5 outputs, to the collision determination section 41, information on each obstacle candidate discriminated to be an obstacle, especially information of its relative distance to the own vehicle. As a consequence, information on the obstacle can be outputted to the collision determination section 41 after removing the non-obstacle from the obstacle candidates detected by the peripheral recognition device 2, whereby unnecessary stop operations and brake operations can be suppressed.

The dump truck 1 travels while detecting obstacle candidates by the millimeter wave radar 21 in a moving direction, specifically in a forward direction in this embodiment. One example of detection data by the millimeter wave radar 21 is shown in FIG. 3.

As shown in FIG. 3, in the detection data from the millimeter wave radar 21, for every identification information (for example, ID=1, ID=2, . . . , ID-n) for uniquely identifying each detected obstacle candidate, the clock times at which reflected waves were received from the corresponding obstacle candidate, its distances from the own vehicle, the angles at which the reflected waves were received, and the reception intensities (reflection intensities) of the reflected waves, all at those clock times, are correlated.

As a vehicle has relatively high reflection intensity, the reception of a reflected wave from the vehicle makes it possible to detect the vehicle even if the vehicle is at a distant position. On the other hand, a non-vehicle (road surface) has relatively low reflection intensity so that there is a tendency to detect a road surface at positions close to the own vehicle. In the example of FIG. 3, ID=1 begins to be detected from a point where the relative distance to the own vehicle is 45 m, and further its reflection intensity is not very high. ID=2, on the other hand, begins to be detected from a point where the relative distance to the own vehicle is 80 m, and further its reflection intensity is relatively high. Accordingly, the obstacle candidate labeled by ID=1 has a high possibility of being a non-vehicle (road surface), and the obstacle candidate labeled by ID=2 is estimated to be a vehicle.

It is one of characteristic features of this embodiment that, if vehicles and non-vehicles (for example, road surfaces) are included in obstacle candidates outputted from the millimeter wave radar 21, every non-vehicle (for example, road surface) is excluded as a non-obstacle from the obstacle candidates based on the above-described characteristic of reflected waves.

Figure 4:
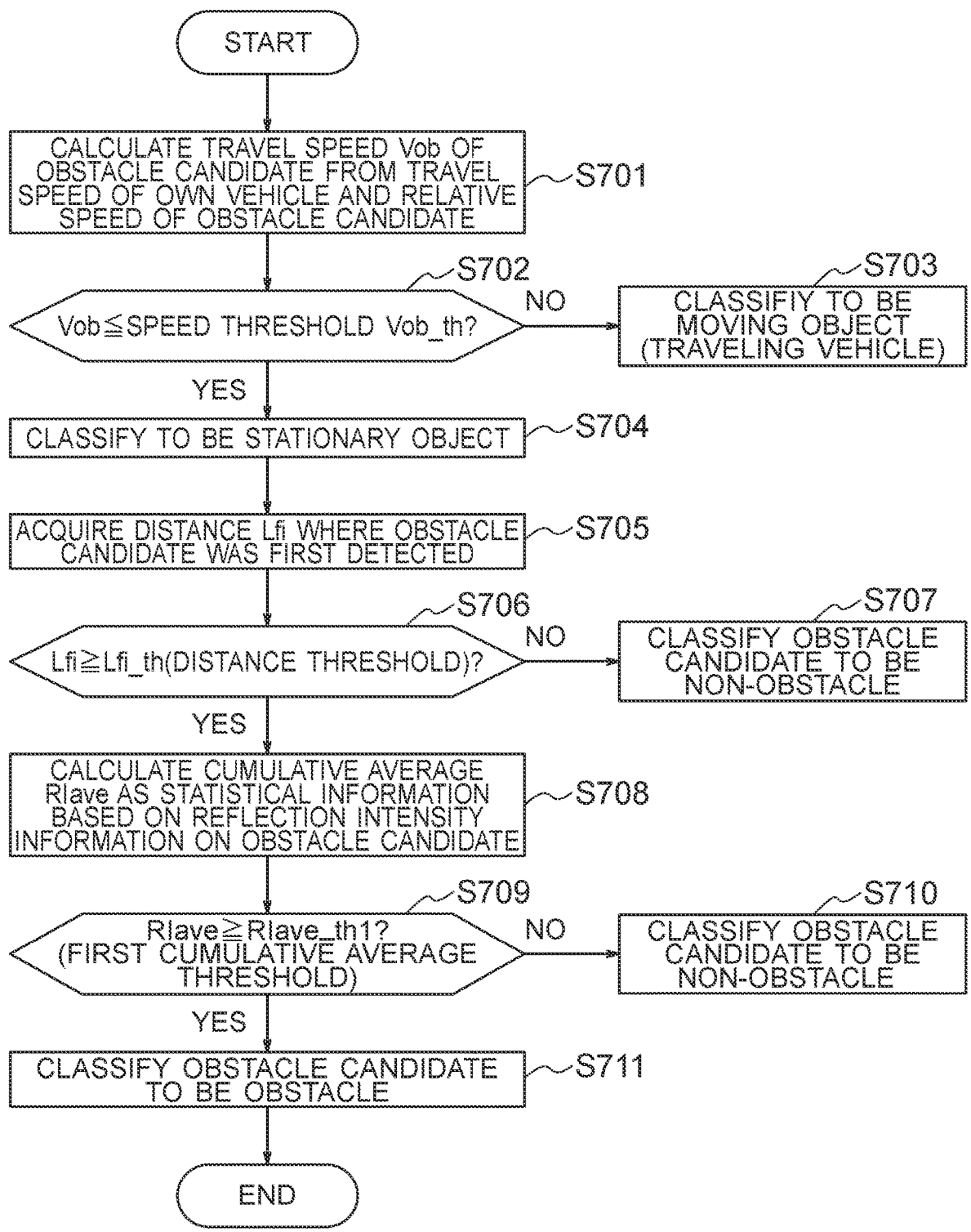
FIG. 4 is a flow chart illustrating one example of classification processing of an obstacle and a non-obstacle.
Figure 5:
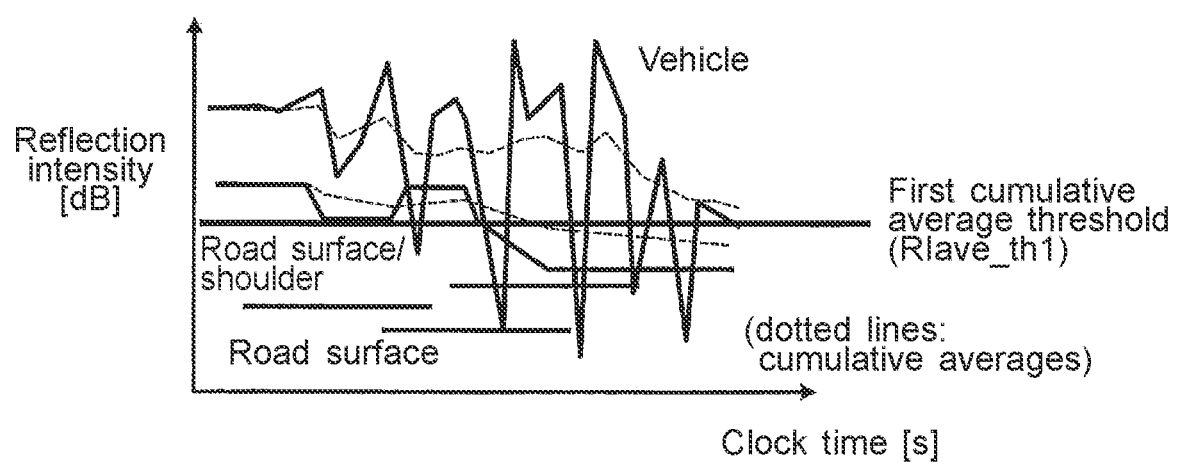
FIG. 5 is a diagram illustrating relationships between respective reflection intensities from a vehicle, road surface/shoulder and a road surface and a first cumulative average threshold.

With reference to FIGS. 4 and 5, a description will hereinafter be made about one example of a method of classifying a road surface, which is a non-vehicle, as a non-obstacle. FIG. 4 is a flow chart illustrating one example of classification processing of an obstacle and a non-obstacle. FIG. 5 is a diagram illustrating relationships between respective reflection intensities from a vehicle, road surface/shoulder and a road surface and a first cumulative average threshold.

Using the millimeter wave radar 21, the dump truck 1 performs detection processing of each obstacle candidate, which is located ahead in a moving direction, during traveling. The travel state determination section 51 calculates a travel speed Vob of the obstacle candidate based on a travel speed of the own vehicle as acquired from the speed sensor 65 and a relative speed of the obstacle candidate as acquired from the millimeter wave radar 21 (S701).

The travel state determination section 51 determines whether the travel speed Vob of the obstacle candidate is equal to or lower than a speed threshold Vob_th set beforehand for classifying moving objects (for example, traveling vehicles) and stationary objects, and if negative (S702/NO), classifies the obstacle candidate to be a moving object (traveling vehicle) (S703). If affirmative (S702/YES), the travel state determination section 51 classifies the obstacle candidate to be a stationary object, and the processing proceeds to step s705 (S704).

The distance filter section 52 acquires a distance Lfi where the obstacle candidate classified to be the stationary object was first detected (S705). In the case of ID=1 in FIG. 3, for example, the distance Lfi corresponds to the distance of 45 mm where ID=1 was first detected.

The distance filter section 52 determines whether the distance Lfi is equal to or greater than a distance threshold Lfi_th set beforehand to classify vehicles and non-vehicles (road surfaces), and if negative (S706/NO), classifies the obstacle candidate to be a non-obstacle (S707). If affirmative, on the other hand, the reflection intensity filter section 53 calculates statistical information based on reflection intensity information on the obstacle candidate (S708). In the example of FIG. 4, a cumulative average RIave of reflection intensities is calculated as the statistical information.

The term "cumulative average" as used herein means the average of reflected intensities from the first detection of the obstacle candidate until most recently. The cumulative average of reflection intensities, for example, from the obstacle candidate labeled by ID=2 in FIG. 3 is determined by the following formula (2):

$$(10+11+10+12+14+13+10+11)/8 \approx 11.4 \qquad (2)$$

The reflection intensity filter section 53 calculates the cumulative average of reflection intensities from the obstacle candidate and, if the cumulative average of reflection intensities is smaller than the first cumulative average threshold RIave_th1 set to classify vehicles and obstacles as non-obstacles (S709/NO), classifies the obstacle candidate to be a non-obstacle (S710). If equal to or greater than the first cumulative average threshold RIave_th1 (S709/YES), the obstacle candidate is classified to be an obstacle (S711).

As illustrated in FIG. 5, the setting of the first cumulative average threshold at a value, which can classify those having high reflection intensity, like vehicles, and those having low reflection intensity, such as road surfaces, makes it possible to classify each obstacle candidate based on a comparison between the cumulative average of reflection intensities from the obstacle candidate and the first cumulative average threshold.

Further, in the above-described example of FIG. 4, the number of pieces of data to be processed at the reflection intensity filter section 53 can be decreased by sifting moving objects (for example, traveling vehicles) as obstacles at the distance filter section 52 to decrease the number of obstacle candidates and then performing the processing at the reflection intensity filter section 53. As the reflection intensity filter section 53 handles statistical information based on past data and the like, its processing load is relatively heavy. The processing load can, therefore, be reduced by decreasing the number of obstacle candidates to be processed at the reflection intensity filter section 53.

As the statistical information of reflection intensities, it is possible to use not only an average but also a variance, because a vehicle generally has a more complex shape than a road surface or a shoulder and has, as a characteristic thereof, a greater fluctuation in reflection intensity than the road surface or shoulder. This characteristic is also seen in FIG. 5, in which the graph representing reflection intensifies from a vehicle has a large fluctuation width whereas the graph representing reflection intensities from road surface/shoulder or a road surface is substantially constant (flat).

Figure 6:
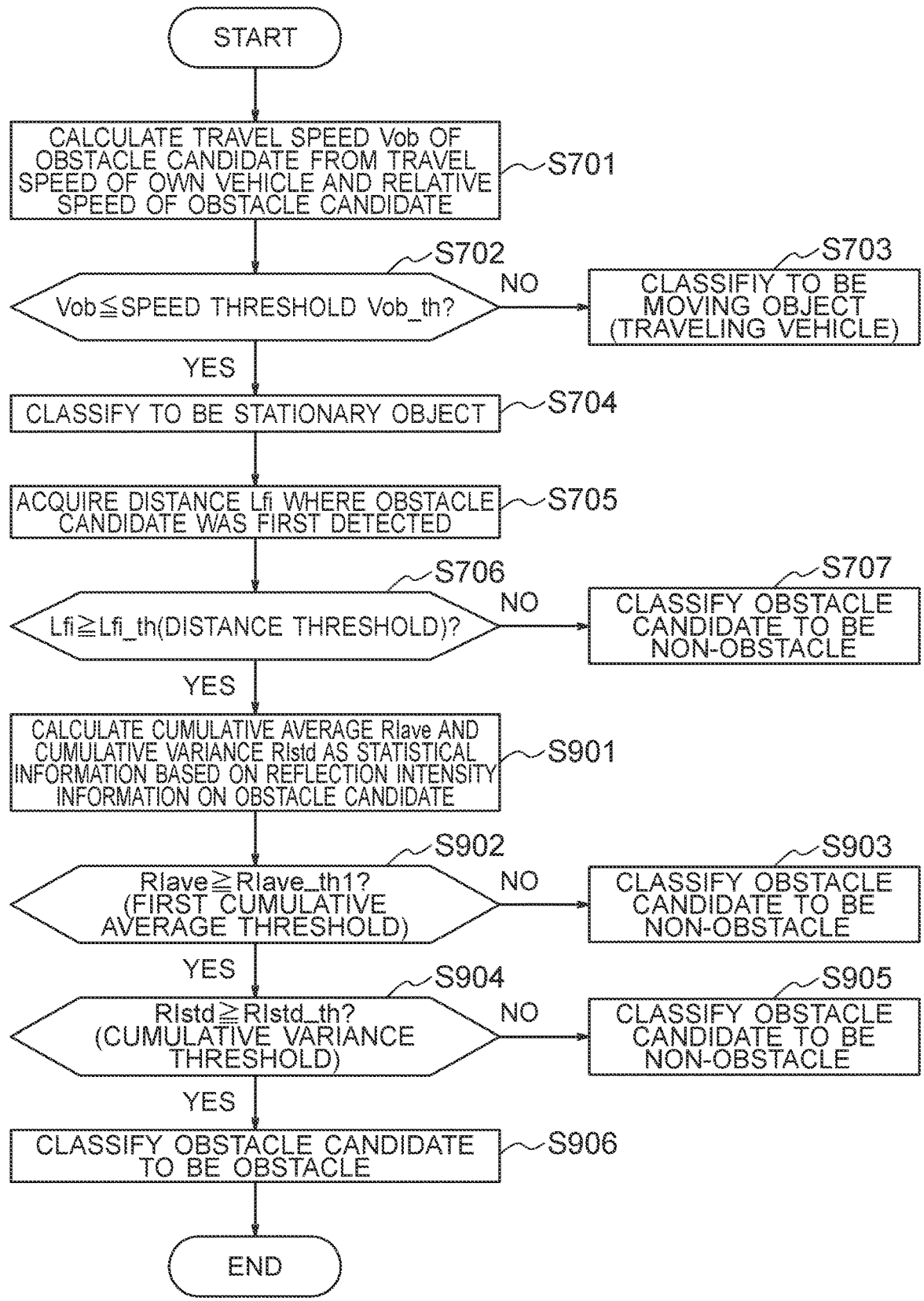
FIG. 6 is a flow chart illustrating another example of the classification processing of an obstacle and a non-obstacle.

Hence, the reflection intensity filter section 53 may classify the obstacle candidate into an obstacle or a non-obstacle by using the variance of reflection intensities as statistical information. Referring to FIG. 6, a description will be made about classification processing into an obstacle or a non-obstacle by using a cumulative variance. FIG. 6 is a flow chart illustrating another example of the classification processing of an obstacle and a non-obstacle. In the example of FIG. 6, the cumulative average and cumulative variance of reflection intensities are used in combination.

In the classification processing of FIG. 6, similar to the processing of FIG. 4, the processing in step 701 to step 707 is executed to sift each obstacle candidate into a moving object or a non-obstacle such as a road surface. An overlapping description of step 701 to step 707 is omitted with respect to FIG. 6 and the below-described, other classification processing of an obstacle and a non-obstacle.

The reflection intensity filter section 53 calculates, as the statistical information based on the reflection intensity information, the cumulative average and cumulative variance RIstd of reflection intensities from each obstacle candidate as detected at the millimeter wave radar 21 (S901). If the cumulative average of reflection intensities is equal to or greater than a first cumulative average threshold (S902/YES) and if the cumulative variance of reflection intensities is equal to or greater than a cumulative variance threshold RIstd_th (S904/YES), the obstacle candidate is classified to be an obstacle such as a vehicle (S906), and otherwise (S902/YES, S904/NO), is classified to be a non-obstacle such as a road surface (S903, S905). The order of execution of the comparison processing between the cumulative average and the first cumulative average threshold of reflection intensities (S902) and the comparison processing between the cumulative variance and the second cumulative average threshold of reflection intensities (S904) may be reversed.

In the above-described example, only each obstacle candidate, which has reflection intensities of the first cumulative average threshold or greater and of the cumulative variance or greater, is classified to be an obstacle. Even if the cumulative average of reflection intensities from a non-obstacle with relatively large reflection intensity, for example, a shoulder is equal to or greater than the first cumulative average, it is thus possible to suppress classification of the shoulder as an obstacle by using the characteristic that the cumulative variance is different between a vehicle and a shoulder.

Figure 7:
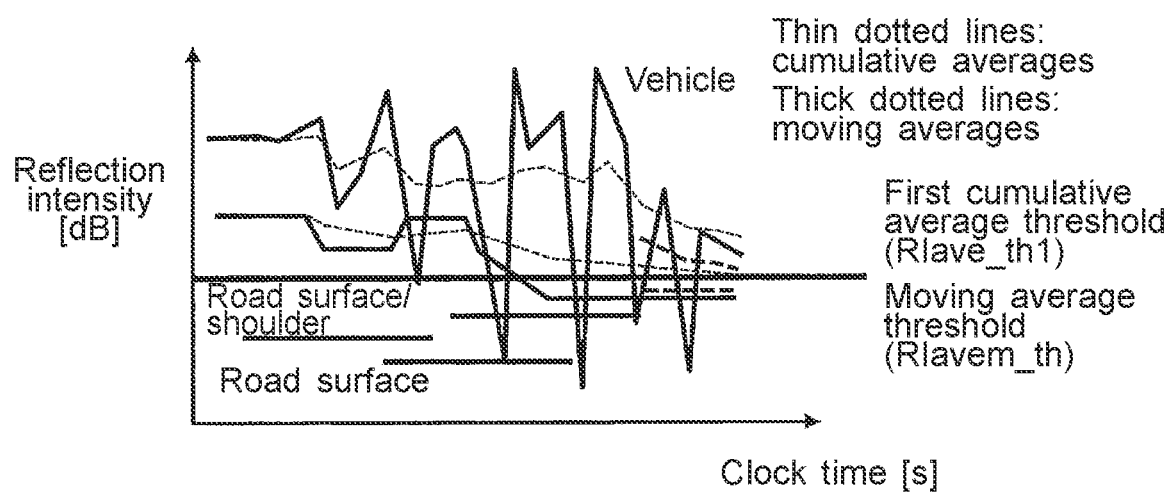
FIG. 7 is a diagram illustrating relationships between respective reflection intensities from a vehicle, road surface/shoulder and a road surface and a cumulative average threshold and moving average threshold.
Figure 8:
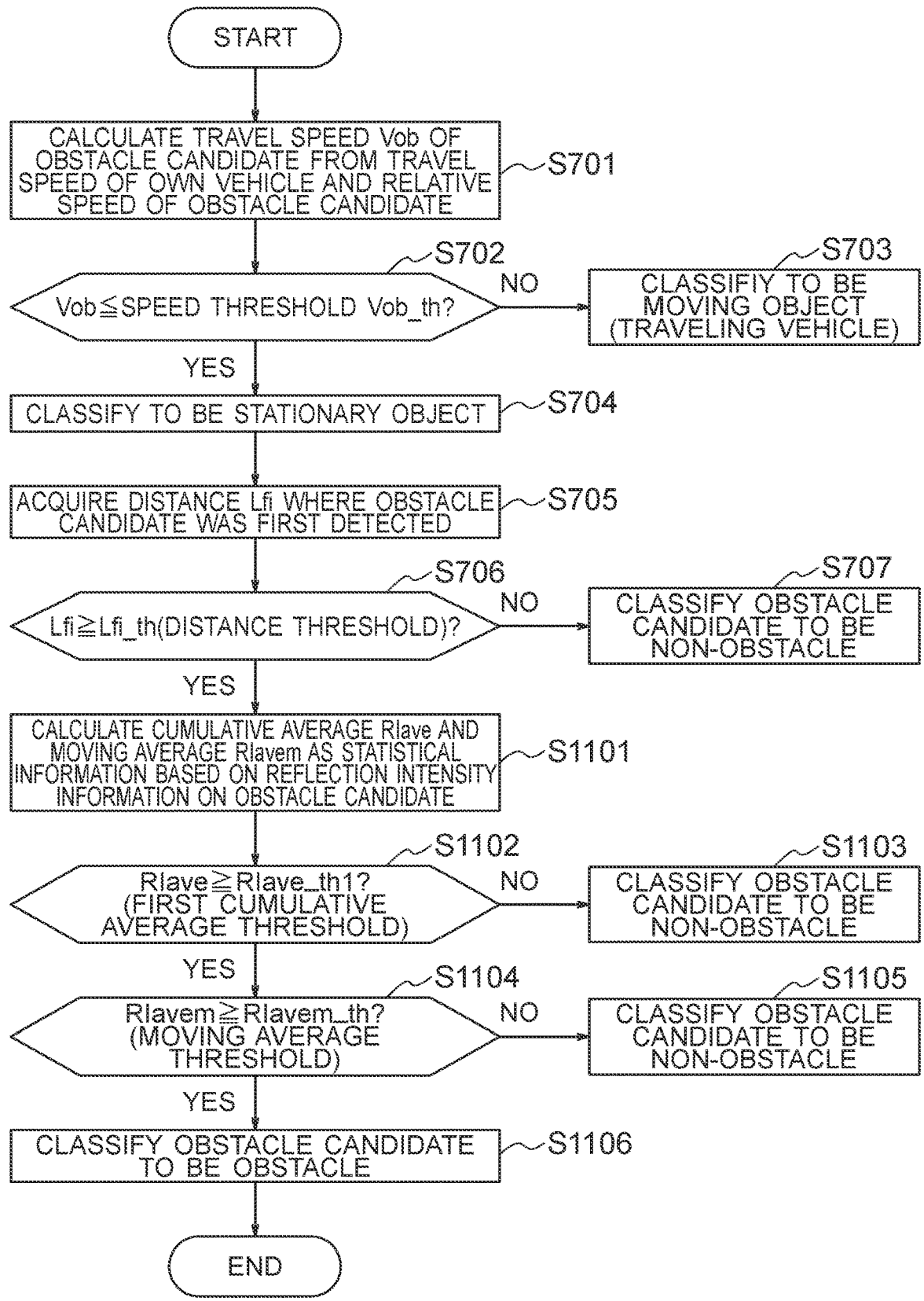
FIG. 8 is a flow chart illustrating a further example of the classification processing of an obstacle and a non-obstacle.

Referring next to FIGS. 7 and 8, a description will be made about a further example of the classification processing of an obstacle and a non-obstacle. FIG. 7 is a diagram illustrating relationships between respective reflection intensities from a vehicle, road surface/shoulder and a road surface and a cumulative average threshold and moving average threshold. FIG. 8 is a flow chart illustrating the further example of the classification processing of the obstacle and the non-obstacle.

In a haulage area of a mine, a shoulder is often provided adjacent to a haul road. When the dump truck 1 detects a forward obstacle candidate at the millimeter wave radar 21 while traveling in the haulage area, a detection value, which indicates the reception of a reflected wave from a road surface under the same ID, may be recorded following a detection value which indicates the reception of a reflected wave from a distant shoulder at the time of the detection of the forward obstacle candidate. As a consequence, the shoulder detected first by the millimeter wave radar 21 and the road surface detected later by the millimeter wave radar 21 may not be distinguished, so that both the shoulder and the road surface may be recognized to be the same obstacle candidate. This means that the detection value of the shoulder is added to the detection value of the shoulder. Then, the statistical information of reflection intensities from the shoulder is reflected to the statistical information of reflection intensities from the road surface, whereby the statistical information of reflection intensities from the road surface is detected with a larger value than the statistical information based on reflection intensities from only the road surface, leading to a concern about a reduction in accuracy upon classifying the road surface as a non-obstacle.

Accordingly, a moving average RIavem may be used as the statistical information of reflection intensities. The term "moving average" as used herein means the average of reflection intensities detected in a predetermined time period preceding a reference time clock, for example, the current time clock. The use of the moving average can facilitate to remove effects of detection values of a shoulder as acquired before. If the moving average of reflection intensities from the obstacle candidate labeled by ID=3 in FIG. 3 is assumed to be the average to the $4^{th}$ unit time before recently, the moving average can be determined by the following formula (3):

$$(2+1+2+3)/4=2 \qquad (3)$$

Among the detection values of ID=n, the reflection intensities at clock times of 0.6 to 0.8 are 5, 6 and 4 and are higher than the detection values at the remaining clock times, and therefore have a possibly of being detection values of reflected waves from the shoulder having higher reflection intensity than the road surface. The cumulative average is calculated including these reflection intensities 5, 6 and 4, and hence tends to have a greater value than the moving average (see FIG. 7). In the case of the moving average, on the other hand, by determining a time period (the number of samples) preceding the reference time and to be taken into consideration in the calculation of an average, it is possible to reduce effects of reflection intensities from an obstacle candidate or obstacle candidates different from the recently detected obstacle candidate and hence to classify obstacles and non-obstacles with improved accuracy.

As illustrated in FIG. 8, the reflection intensity filter section 53 therefore calculates, as the statistical information based on the reflection intensity information, the cumulative average of reflection intensities from an obstacle candidate as detected at the millimeter wave radar 21 and their moving average as an average from the current clock time to a clock time before a predetermined time period (S1101), classifies the obstacle candidate to be an obstacle (S1106) if the cumulative average of reflection intensities is equal to or greater than the first cumulative average threshold (S1102/YES) and if the moving average of reflection intensities is equal to or greater than the moving average threshold (S1104/YES), and otherwise (S1102/NO, S1104/NO) classifies the obstacle candidate to be a non-obstacle (S1103, S1105). The order of execution of the comparison processing between the cumulative average of reflection intensities and the first cumulative average threshold (S1102) and the comparison processing between the moving average of reflection intensities and the moving average threshold may be reversed.

Owing to the classification processing of the obstacle and non-obstacle as illustrated in FIG. 8, even if the detection value of a reflected wave from a different obstacle candidate is mixed with the detection value of a reflected wave from an obstacle candidate as an object to be determined, the calculation of statistical information by the use of the detection values of most recent plural reflected waves from the obstacle candidate as the object to be determined makes it possible to perform the classification processing by reducing effects of the detection value from the obstacle candidate different from the obstacle candidate as the object to be determinate. As a consequence, the accuracy of the classification processing can be improved.

Figure 9:
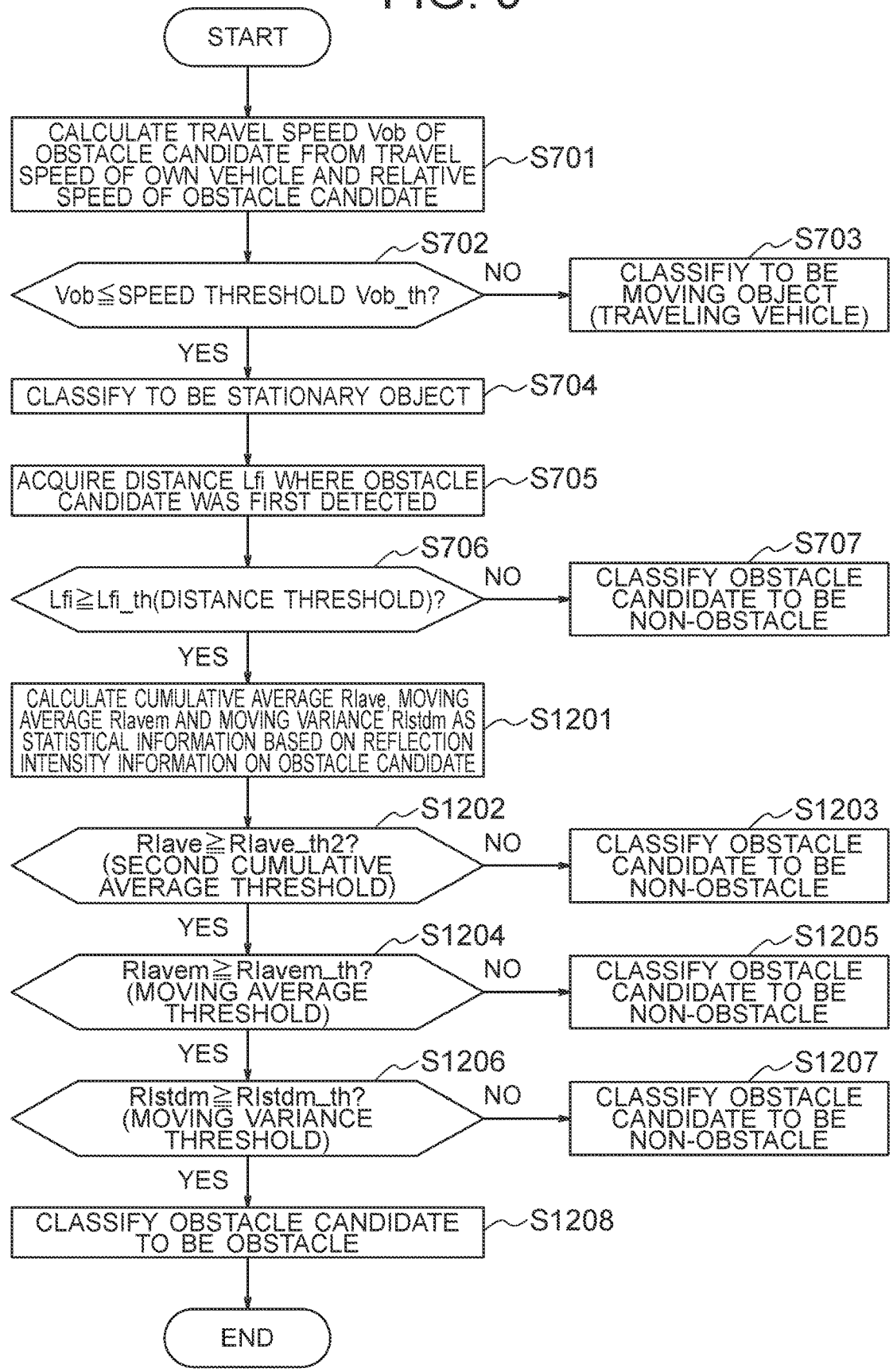
FIG. 9 is a flow chart illustrating yet another example of the classification processing of an obstacle and a non-obstacle.
Figure 10:
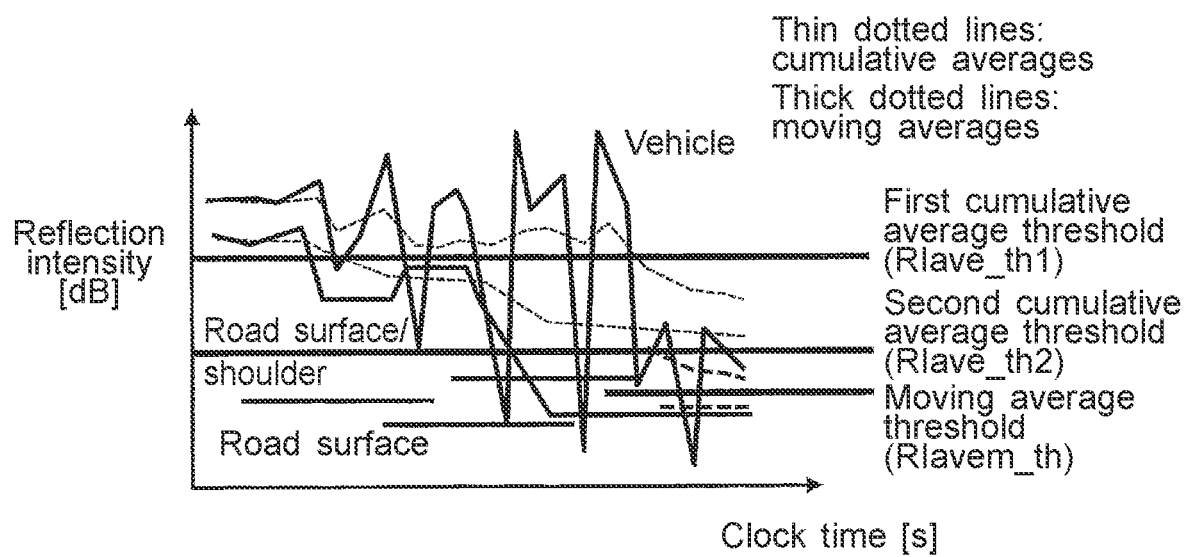
FIG. 10 is a diagram illustrating relationships between respective reflection intensities from a vehicle, road surface/shoulder and a road surface, and a first cumulative average threshold, second cumulative average threshold and moving average threshold.

As yet another example of the classification processing of an obstacle and a non-obstacle, a cumulative average, moving average and moving variance may be used in combination. This example will be described with reference to FIGS. 9 and 10. FIG. 9 is a flow chart illustrating the yet another example of the classification processing of the obstacle and the non-obstacle. FIG. 10 is a diagram illustrating relationships between respective reflection intensities from a vehicle, road surface/shoulder and a road surface, and a first cumulative average threshold, second cumulative average threshold and moving average threshold.

As illustrated in FIG. 9, the reflection intensity filter section 53 calculates, as statistical information based on reflection intensity information, the cumulative average of reflection intensities, a moving average as the average of reflection intensities from the current time clock to a time clock before a predetermined time period, and a moving variance RIstdm as the variance of the reflection intensities to the clock time before the predetermined time period (S1201), classifies the obstacle candidate to be an obstacle (S1208) if the cumulative average of reflection intensities is equal to or greater than the second cumulative average threshold RIave_th2 (S1202/YES), and the moving average of reflection intensities is equal to or greater than the moving average threshold (S1204/YES), and the moving variance of reflection intensities is equal to or greater than the moving variance threshold RIstdm_th (S1206/YES), and otherwise (S1202/NO, S1204/NO, S1206/NO) classifies the obstacle candidate to be a non-obstacle such as a road surface (S1203,S1205,S1207).

The second cumulative average threshold RIave_th2 has a smaller value than the first cumulative average threshold RIave_th1 used in the processing of FIGS. 4, 6 and 8 (see FIG. 10). Therefore, the detection values from only the road surface are classified to the non-obstacle (S1202/NO, S1203), but the cumulative average of detection values mixed with detection values of reflected waves from road surface/shoulder becomes equal to or greater than the second cumulative average threshold RIave_th2 and the road surface/shoulder remain as obstacle candidates. Here, the moving average and the moving variance are used in combination to suppress classification of the road surface as an obstacle under the effects of reflected waves from the shoulder.

In other words, the use of the moving average lowers the effects of detection values of a shoulder detected at a distance, and the use of the moving variance classifies an obstacle candidate having a large variance of reflection intensities, like a vehicle, and an obstacle candidate having a small variance of reflection intensities, like a shoulder or road surface.

It is to be noted that in FIG. 9, the order of execution of step 1202, step 1204 and step 1206 is not limited to the order of FIG. 9 and may be arbitrary.

Figure 11:
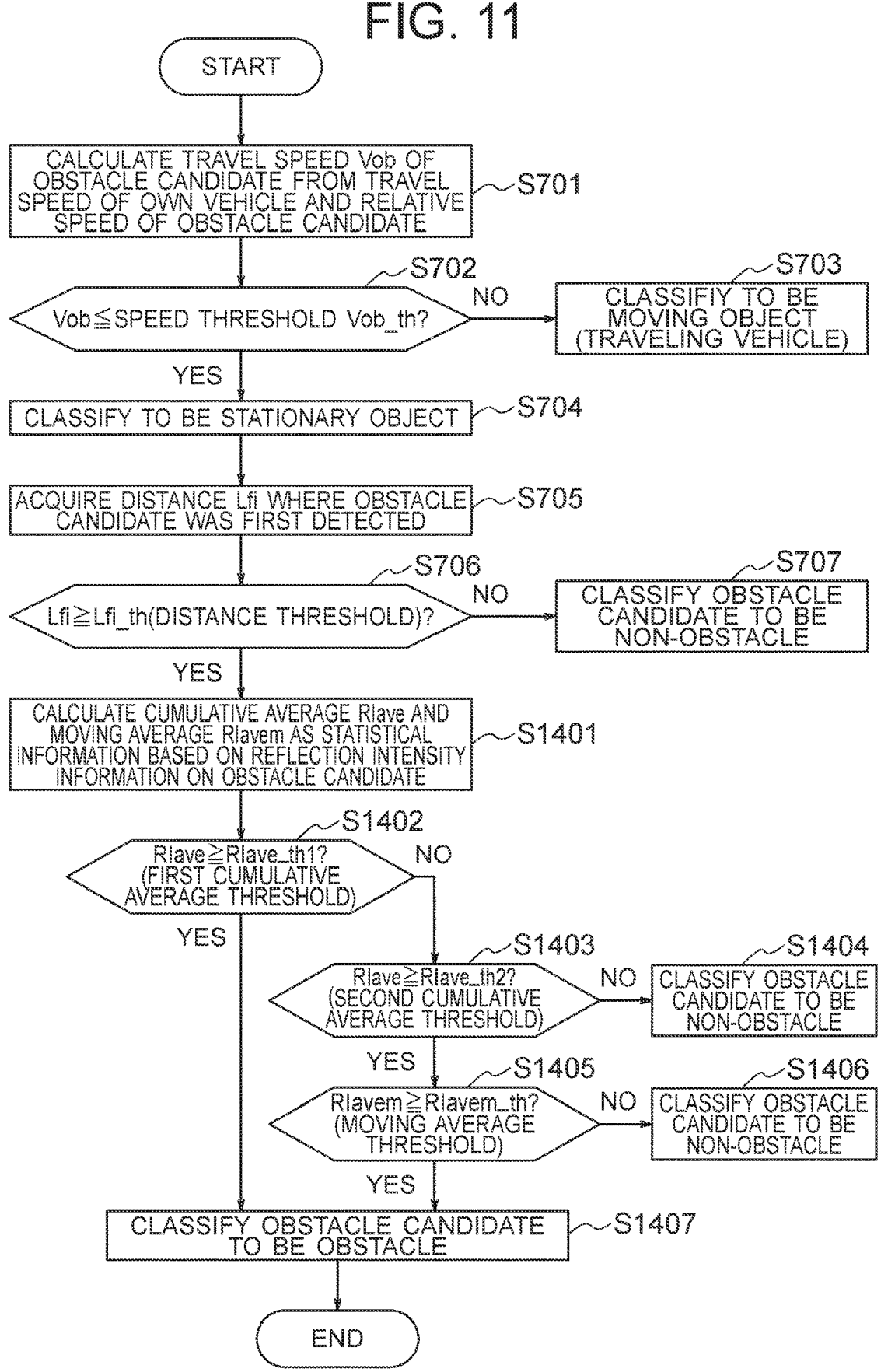
FIG. 11 is a flowchart illustrating a yet further example of the classification processing of an obstacle and a non-obstacle.

Referring to FIG. 11, a description will be made about a yet further example of the classification processing of an obstacle and a non-obstacle. FIG. 11 is a flow chart illustrating the yet further example of the classification processing of the obstacle and the non-obstacle. As illustrated in FIG. 11, the reflection intensity filter section 53 calculates, as statistical information based on reflection intensity information, the cumulative average and the moving average of reflection intensities (S1401), classifies the obstacle candidate to be an obstacle (S1407) if the cumulative average of reflection intensities is equal to or greater than the first cumulative average threshold (S1402/YES) or if the cumulative average of reflection intensities is equal to or greater than the second cumulative average threshold but is smaller than the first cumulative average threshold (S1402/NO, S1403/YES), and if the moving average threshold of the reflection intensities is equal to or greater than the moving average threshold (S1405/YES), and otherwise (S1403/NO, S1405/NO) classifies the obstacle candidate to be a non-obstacle (S1404,S1406).

According to this example, obstacle candidates with relatively high reflection intensity, like vehicles, are classified to be obstacles, and among remaining obstacle candidates, those having relatively high reflection intensity (for example, an obstacle candidate consisting of a road surface only) are classified as non-obstacles. Still remaining obstacle candidates are then subjected to classification based on their moving averages, whereby the effects of a shoulder or vehicle detected at a distance can be removed and a near road surface can be classified to be a non-obstacle with higher accuracy.

Concerning the order of execution of step 1403 and step 1405 in FIG. 11, whichever step may be executed first.

As a yet further example of the classification processing of an obstacle and a non-obstacle, comparison processing between the moving variance of reflection intensities and the moving variance threshold may be added to the classification processing of FIG. 11. Described specifically, as illustrated in FIG. 12, the reflection intensity filter section 53 further determines the moving average as statistical information that uses reflection intensity information (S1501), classifies the obstacle candidate to be an obstacle (S1509) if the cumulative average of reflection intensities is equal to or greater than the first cumulative average threshold (S1502/YES) or if the cumulative average of reflection intensities is equal to or greater than the second cumulative average threshold but is smaller than the first cumulative average threshold (S1502/NO, S1503/YES), and if the moving average of reflection intensities is equal to or greater than the moving average threshold (S1015/YES), and if the moving variance of reflection intensities is equal to or greater than the moving variance threshold (S1507/YES), and otherwise (S1503/NO, S1505/NO, S1507/NO) classifies the obstacle candidate to be a non-obstacle (S1504,S1506,S1508).

Figure 12:
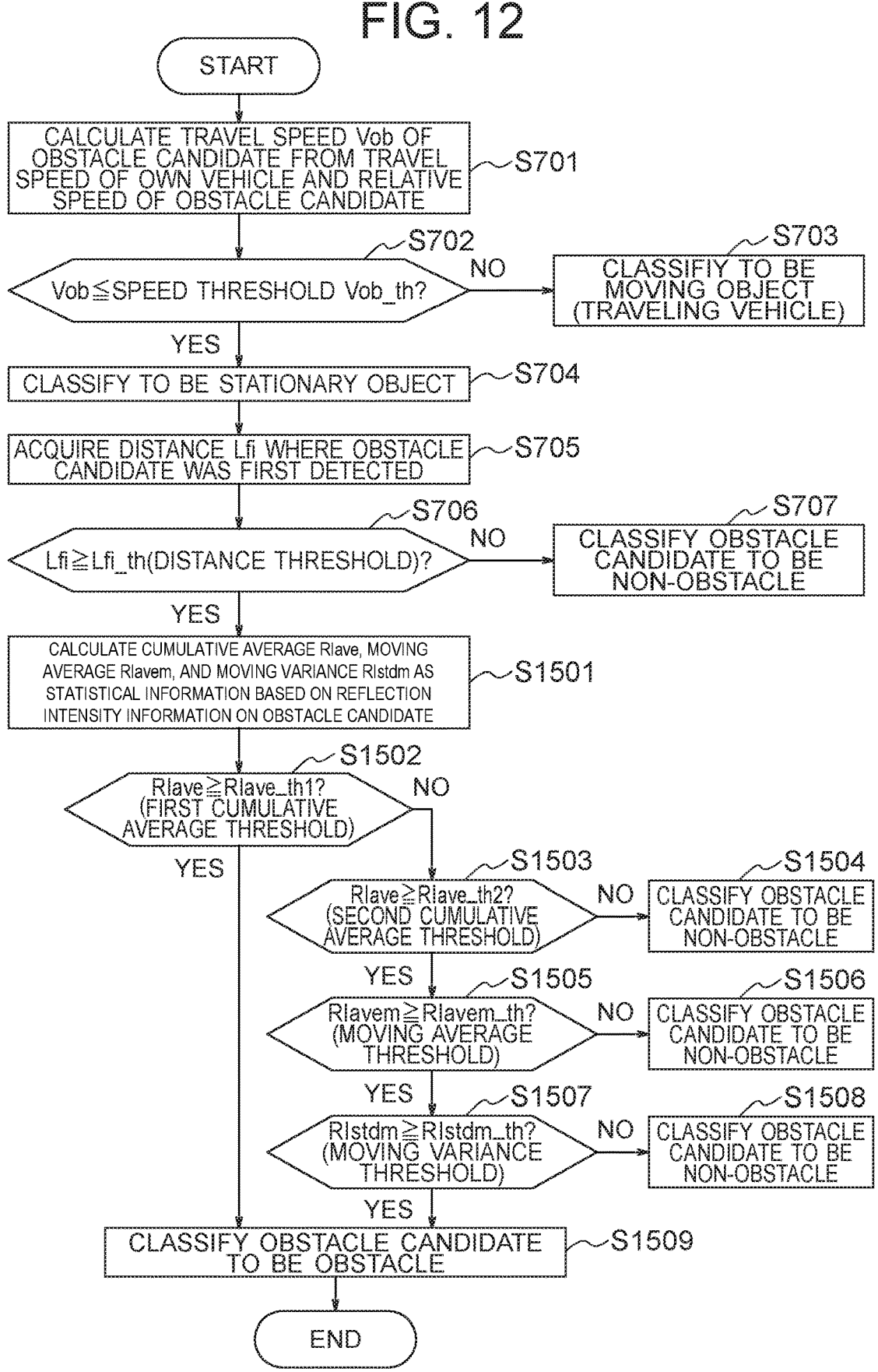
FIG. 12 is a flowchart illustrating still another example of the classification processing of an obstacle and a non-obstacle.
Figure 13:
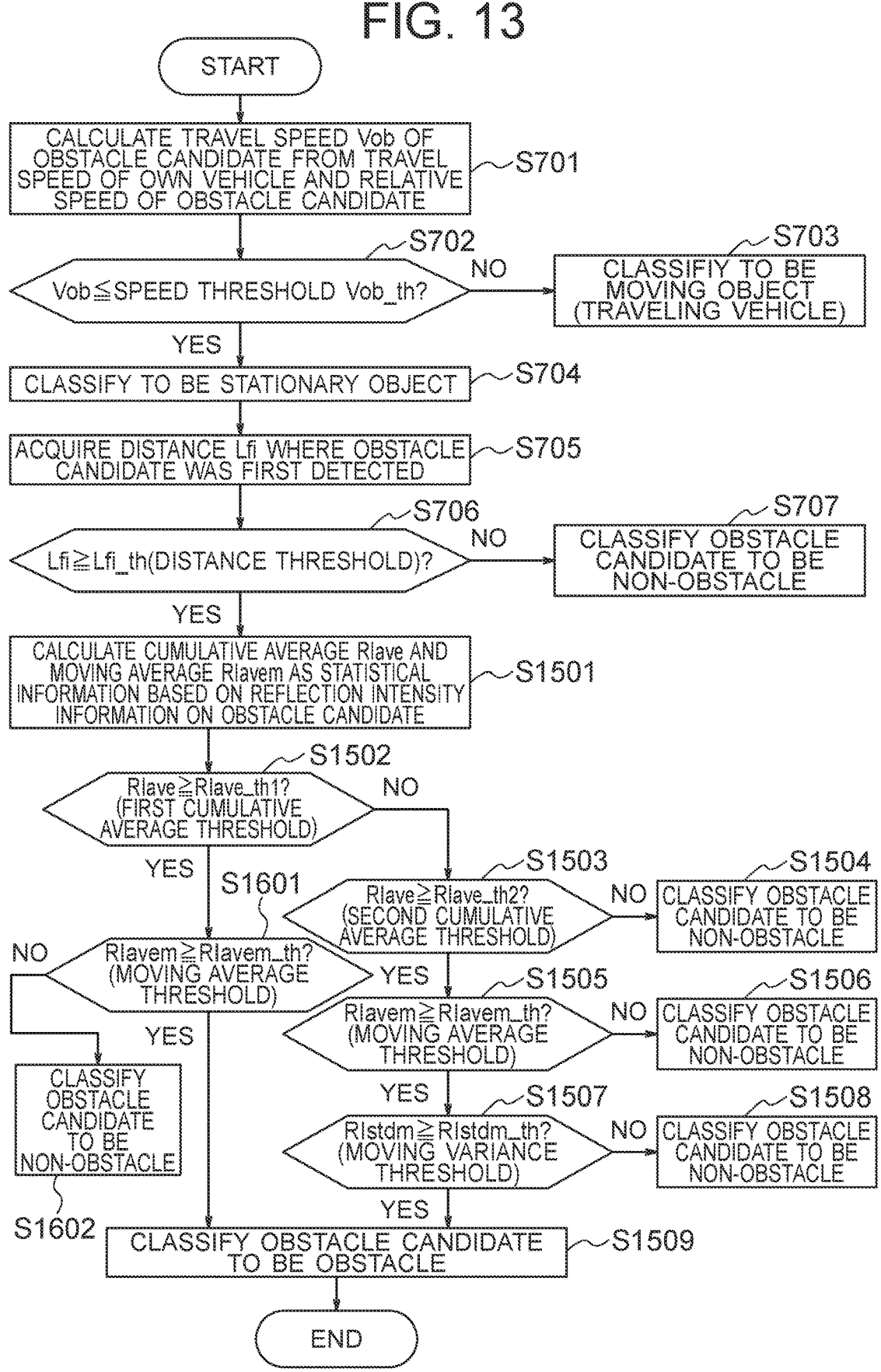
FIG. 13 is a flow chart illustrating a still further example of the classification processing of an obstacle and a non-obstacle.

As illustrated in FIG. 13, the reflection intensity filter section 53 may further compare the moving average of the obstacle candidate, the cumulative average of reflection intensities of which has been determined to be equal to or greater than the first cumulative average threshold (S1502/YES), with the moving average threshold (S1601) in addition to the respective steps (S701 to S1509) in FIG. 12. If the moving average is smaller than the moving average threshold (S1601/NO), the reflection intensity filter section 53 classifies the obstacle candidate to be a non-obstacle (S1602). If the moving average is equal to or greater than the moving average threshold (S1601/YES), the reflection intensity filter section 53 classifies the obstacle candidate to be an obstacle (S1509).

Even in the case of an obstacle candidate with strong reflection intensity, the obstacle candidate is, therefore, classified to be a non-obstacle if variations of reflection intensity, the variations being characteristic to a vehicle, is small so that an obstacle such as a vehicle can be classified with still higher accuracy.

As has been described above, according to this embodiment, if a dump truck has detected obstacle candidates by a peripheral recognition device like a millimeter wave radar, a threshold is set for travel speeds of the obstacle candidates to classify stationary objects and travel vehicles (which fall under the category of obstacles), and among the obstacle candidates classified to be the stationary objects, the stationary objects which were first detected at a predetermined distance or shorter are excluded as non-obstacles. Further, another threshold is set for statistical information of reflection intensities from the stationary objects to remove the stationary objects, which are non-vehicles, as non-obstacles, whereby detection of anon-obstacle as an obstacle is suppressed while increasing the detection accuracy of an obstacle. As a consequence, it is possible to suppress unnecessary decelerations, stops and alarm operations.

The above-described embodiment does not restrict the present invention, and various modifications without departing from the spirit of the present invention are included in the present invention. For example, the foregoing embodiment has been described to facilitate the understanding of the present invention, and therefore the present invention shall not be absolutely restricted to those including all the configurations described.

For example, the reflection intensity filter section 53 is applied not only to a stationary object the travel speed of which is close to zero, but may also be applied likewise to a moving object, for example, a traveling vehicle.

The configurations described in the above-described embodiment are not limited to mining vehicles, but can also be applied to vehicles, which travel in construction sites, and general automotive vehicles, and can bring about similar advantageous effects.

Legends

1 ... dump truck (mining haul vehicle), 2 ... peripheral recognition device, 5 ... obstacle discrimination device, 10 ... control server

The invention claimed is:

1. An off-road dump truck comprising:
a peripheral recognition device configured to radiate an electromagnetic wave forward in a moving direction, to receive reflected waves from obstacle candidates, and to detect intensities of the reflected waves, distances from the off-road dump truck to the obstacle candidates and relative speeds of the obstacle candidates to the off-road dump truck,
a speed sensor configured to detect a travel speed of the off-road dump truck, and
an obstacle discrimination device configured to classify obstacles and non-obstacles in the obstacle candidates, and to output, as obstacles, the obstacle candidates classified as the obstacles,
wherein the obstacle discrimination device includes:
a travel state determination section that based on the relative speed of each obstacle candidate and the travel speed of the off-road dump truck, determines whether the obstacle candidate is a stationary object or a moving object, and, if the obstacle candidate has been determined as the moving object, outputs the obstacle candidate as an obstacle,
a distance filter section that, if the obstacle candidate has been determined as the stationary object, determines the obstacle candidate to be an object other than that which is to be outputted if a distance where the obstacle candidate was first detected is smaller than a distance threshold set to distinguish vehicles and non-vehicles, and
a reflection intensity filter section that, if the distance where the obstacle candidate determined as the stationary object was first detected is equal to or greater than the distance threshold, calculates statistical information based on reflection intensity information indicating the intensities of the reflected waves from the obstacle candidate, and determines the obstacle candidate to be an object other than that which is to be outputted if the statistical information based on the reflection intensity information is less than a reflection intensity threshold set to distinguish vehicles and non-vehicles but outputs the obstacle candidate as an obstacle if the reflection intensity information is equal to or greater than the reflection intensity threshold, and
the reflection intensity filter section outputs the obstacle candidate as an obstacle if cumulative statistical information calculated using reflection intensity information detected from the first detection of a reflected wave from the obstacle candidate until a present time is equal to or greater than a cumulative statistical information threshold and if moving statistical information calculated using reflection intensity information detected during a predetermined time period to a predetermined time point preceding the present time is equal to or greater than a moving statistical information threshold.

2. The off-road dump truck according to claim 1, wherein:
the reflection intensity threshold is a reflection intensity threshold set to separate reflection intensities from a vehicle and reflection intensities from a road surface.

3. The off-road dump truck according to claim 1, wherein:
if reflection intensity information of a reflected wave from a shoulder located distant from the off-road dump truck and reflection intensity information of a reflected wave from a road surface near the off-road dump truck are included in the reflection intensity information on the obstacle candidate, the predetermined time period is a time period sufficient to permit extraction of only the reflection intensity information of the reflected wave from the road surface near the off-road dump truck.

4. The off-road dump truck according to claim 1, wherein: the reflection intensity filter section sets, for the cumulative statistical information, a first cumulative information threshold to discriminate vehicles and non-vehicles and a second cumulative information threshold smaller in value than the first cumulative information threshold, and outputs the obstacle candidate to be an obstacle if the cumulative statistical information based on the reflection intensity information on the obstacle candidate is equal to or greater than the first cumulative information threshold or if the moving statistical information is equal to or greater than the second cumulative information threshold but less than the first cumulative information threshold and is equal to or greater than a moving statistical information threshold set to discriminate vehicles and non-vehicles.

5. The off-road dump truck according to claim 1, wherein: the statistical information based on the reflection intensity information is at least one of an average and a variance.

6. An obstacle discrimination device for use in a vehicle with a peripheral recognition device and a speed sensor mounted thereon, the peripheral recognition device being configured to radiate an electromagnetic wave forward in a moving direction, to receive reflected waves from obstacle candidates, and to detect intensities of the reflected waves, distances from the vehicle to the obstacle candidates and relative speeds of the obstacle candidates to the vehicle, and the speed sensor being configured to detect a travel speed of the vehicle, wherein the obstacle discrimination device includes:

a travel state determination section that based on the relative speed of each obstacle candidate and the travel speed of the vehicle, determines whether the obstacle candidate is a stationary object or a moving object, and, if the obstacle candidate has been determined as the moving object, outputs the obstacle candidate as an obstacle, a distance filter section that, if the obstacle candidate has been determined as the stationary object, determines the obstacle candidate to be an object other than that which is to be outputted if a distance where the obstacle candidate was first detected is smaller than a distance threshold set to distinguish vehicles and non-vehicles, and a reflection intensity filter section that, if the distance where the obstacle candidate was first detected is equal to or greater than the distance threshold, calculates statistical information based on reflection intensity information indicating the intensities of the reflected waves from the obstacle candidate, and determines the obstacle candidate to be an object other than that which is to be outputted if the statistical information based on the reflection intensity information is less than a reflection intensity threshold set to distinguish vehicles and non-vehicles but outputs the obstacle candidate as an obstacle if the reflection intensity information is equal to or greater than the reflection intensity threshold, and the reflection intensity filter section outputs the obstacle candidate as an obstacle if cumulative statistical information calculated using reflection intensity information detected from the first detection of a reflected wave from the obstacle candidate until a present time is equal to or greater than a cumulative statistical information threshold and if moving statistical information calculated using reflection intensity information detected during a predetermined time period to a predetermined time point preceding the present time is equal to or greater than a moving statistical information threshold.

* * * * *